(12) United States Patent
Rabipour et al.

(10) Patent No.: US 8,116,335 B2
(45) Date of Patent: Feb. 14, 2012

(54) METHODS AND APPARATUS FOR DATA COMMUNICATION

(75) Inventors: Rafi Rabipour, Côte St-Luc (CA); Chung Cheung Chu, Brossard (CA); Pierre Gendron, Auteuil-Laval (CA); William Navarro, Velizy-Villacoublay (FR); Paul Boudreaux, Garland, TX (US)

(73) Assignee: Kapsch Carriercom France S.A.S., Paris (FR)

( * ) Notice: Subject to any disclaimer, the term of this patent is extended or adjusted under 35 U.S.C. 154(b) by 1121 days.

(21) Appl. No.: 11/984,490

(22) Filed: Nov. 19, 2007

(65) Prior Publication Data

US 2008/0069090 A1   Mar. 20, 2008

Related U.S. Application Data

(63) Continuation of application No. 10/682,070, filed on Oct. 10, 2003, now abandoned, which is a continuation-in-part of application No. 10/235,959, filed on Sep. 6, 2002, now Pat. No. 7,639,601.

(60) Provisional application No. 60/393,386, filed on Jul. 5, 2002, provisional application No. 60/395,271, filed on Jul. 12, 2002.

(51) Int. Cl.
*H04L 12/28* (2006.01)
*H04L 12/56* (2006.01)
*H04L 12/66* (2006.01)

(52) U.S. Cl. ......... 370/419; 370/389; 370/356; 370/463

(58) Field of Classification Search .................. 370/352, 370/356, 389, 419, 463
See application file for complete search history.

(56) References Cited

U.S. PATENT DOCUMENTS

| 5,933,487 | A | 8/1999 | Strickland | |
|---|---|---|---|---|
| 6,141,784 | A | 10/2000 | Davis et al. | |
| 6,185,424 | B1 * | 2/2001 | Pon et al. | ....................... 455/445 |
| 6,256,612 | B1 | 7/2001 | Vo et al. | |
| 6,272,358 | B1 | 8/2001 | Brent et al. | |
| 6,353,666 | B1 | 3/2002 | Henderson et al. | |
| 6,389,005 | B1 * | 5/2002 | Cruickshank | ................. 370/352 |
| 6,574,469 | B1 | 6/2003 | Xiang et al. | |
| 6,600,738 | B1 | 7/2003 | Alperovich et al. | |
| 6,721,269 | B2 * | 4/2004 | Cao et al. | ....................... 370/227 |
| 6,842,461 | B2 | 1/2005 | Harris | |
| 6,885,638 | B2 | 4/2005 | Xu et al. | |

(Continued)

FOREIGN PATENT DOCUMENTS

| EP | 0 907 280 A2 | 4/1999 |
|---|---|---|
| EP | 1 076 466 A1 | 2/2001 |

OTHER PUBLICATIONS

PCT/CA03/00972 (P-ISR), Nov. 3, 2003, Nortel Networks . . . .

(Continued)

*Primary Examiner* — Ronald Abelson
(74) *Attorney, Agent, or Firm* — Hoffman & Baron, LLP (57) ABSTRACT

A data communication apparatus, comprising an interface for enabling communication with a remote entity via a network and a control entity in communication with said interface. The control entity is operative to establish a packet-switched connection with the remote entity through the network and to negotiate with the remote entity using in-band signaling entry into a codec-bypass mode of operation. In this way, a codec-bypass connection, which enhances speech quality, can be established over a packet network, which reduces bandwidth.

16 Claims, 5 Drawing Sheets

U.S. PATENT DOCUMENTS

| | | |
|---|---|---|
| 6,985,530 B1 | 1/2006 | Zerbe |
| 2002/0054571 A1 | 5/2002 | Falsafi |
| 2003/0072273 A1 | 4/2003 | Aiello et al. |
| 2003/0135376 A1* | 7/2003 | Harada .......................... 704/275 |
| 2004/0100914 A1 | 5/2004 | Hellwig et al. |
| 2006/0046658 A1* | 3/2006 | Cruz et al. ................. 455/67.11 |

OTHER PUBLICATIONS

"Digital Cellular telecomunication system . . . ", XP002248624, 3GPP TS 28.062 version 5.0.0 Release 5, ETSI TS 128 062 V5.0.0, Mar. 2002, pp. 14-19,35-51,56-59,81-88,164-168.

Final Office Action mailed on May 14, 2008 in connection with U.S. Appl. No. 10/235,959.

Office Action mailed on Mar. 3, 2009 in connection with U.S. Appl. No. 10/235,959.

Office Action mailed on May 17, 2007 in connection with corresponding U.S. Appl. No. 10/682,070.

Office Action mailed on Jul. 12, 2007 in connection with corresponding U.S. Appl. No. 10/235,959.

Office Action mailed on Jul. 25, 2008 in connection with corresponding U.S. Appl. No. 10/235,959.

* cited by examiner

FIG. 7

METHODS AND APPARATUS FOR DATA COMMUNICATION

This application is a Continuation of U.S. patent application Ser. No. 10/682,070 to Rabipour et al., filed Oct. 10, 2003 now abandoned, which is a Continuation-In-Part of U.S. patent application Ser. No. 10/235,959 to Rabipour et al., filed Sep. 6, 2002 now U.S. Pat. No. 7,639,601, which claims priority based on U.S. Provisional Patent Application Ser. No. 60/393,386, filed on Jul. 5, 2002 and U.S. Provisional Patent Application Ser. No. 60/395,271, filed on Jul. 12, 2002, all of which are hereby incorporated by reference in their entirety.

FIELD OF THE INVENTION

The present invention relates generally to communications networks and, more particularly, to methods and apparatus for increasing the service quality and efficiency with which data is communicated between entities in such networks.

BACKGROUND OF THE INVENTION

According to most existing telecommunications standards, the transmission of speech information over a wireless interface takes the form of compressed speech parameters. Upon receipt of compressed speech parameters at a base station in communication with a mobile unit, the speech parameters are processed by a codec (coder/decoder), which converts (expands) the speech parameters into speech samples, typically at a rate of 64 kilobits per second (kb/s) in order to provide compatibility with the public switched telephone network (PSTN). The speech samples at 64 kb/s are then transmitted over the PSTN towards the called party. The speech samples associated with a given call may share the same link as speech samples associated with other calls by virtue of time division multiplexing (TDM), which provides for fixed-duration time slots to be allotted to individual calls.

If the called party is connected directly to the PSTN, such as via a wireline connection, the speech samples having travelled through the network will simply be converted into audio form by a digital telephone unit at the called party site. Of course, the called party may also be a second mobile unit, in which case the speech samples will terminate at a second base station, where a second codec re-converts the speech samples back into compressed speech parameters for transmission to the second mobile unit via a wireless interface. The usage of a source decoder to expand speech parameters into a stream of speech samples, in combination with the use of a destination encoder for re-compression of these samples into a second set of compressed speech parameters, is referred to as operation of codecs in tandem, or "tandem operation".

Those skilled in the art will appreciate that when both the called and calling parties are mobile units, the tandem operation described above introduces a degradation in service quality, as errors may be introduced by the decompression and re-compression operations performed by the source and destination codecs, respectively. Such error should in principle be avoidable, as neither codec operation is required by virtue of the second base station requiring the compressed speech parameters rather than the expanded speech samples. Thus, it is of interest to find a solution to the problem of service quality in call connections involving tandem codecs.

Two classes of solutions to the problem relating to the service quality in call connections involving tandem codecs have already been described and standardized, or are well in their way towards standardization. The earlier of the two methods, called Tandem-Free Operation (TFO), uses an in-band handshaking protocol to detect the presence of tandem codecs, and then proceeds to insert the compressed speech parameters within the 64 kb/s sample stream. This arrangement bypasses the requirement for decompression at the source codec and (re-)compression at the destination codec, which obviates the occurrence of errors at these two stages. As a result, a high quality of service can be achieved for a given end-to-end call between two mobile units. However, the standardized TFO approach provides no bandwidth advantage, as the full bandwidth ordinarily needed for the 64 kb/s sample stream is consumed for transmission of the compressed speech parameters.

A more recent approach, called Transcoder-Free Operation (TrFO), uses out-of-band signaling to detect call scenarios involving tandem codecs at call set-up time. Thereupon action is taken to put in place a direct end-to-end link to provide for a direct exchange of the compressed speech parameters without the involvement of network transcoders. However, while it provides for a savings and resource reduction compared to the standardized TFO approach, the TrFO implementation suffers from the disadvantage of added cost and complexity due to, for example, the requirement for out-of-band signaling.

From the above, it will be apparent that there is a need in the industry to provide a solution that is as robust and easy to implement as TFO, while providing the bandwidth and resource savings of TrFO.

Moreover, the use of TFO has heretofore been limited to enhancing the quality of calls established between two TFO-enabled base station units in a mobile-to-mobile call. When one party is not a TFO-enabled base station unit, e.g., a telephone connected to a common packet-switched network via a network gateway, the use of TFO is not possible. It would therefore be an advantage to exploit the ability of one party's TFO capabilities, even when the other party is not a TFO-enabled base station unit.

In addition, the use of TFO is often limited by the use of backhaul gateways in a network, even when both parties to a call are TFO-enabled base station units. Such gateways compress speech samples into a different format prior to transmittal of the formatted speech samples over a network. Unfortunately, when TFO information is carried within the bit structure of the speech samples, the compression effected by a backhaul gateway results in loss of the TFO information and hence prevents advantageous usage of this facility. Hence, it would be beneficial to be able to allow codec-bypass operation in circumstances where a backhaul gateway is used.

For more information on the TFO and TrFO techniques, the reader is invited to refer to the following documents that are hereby incorporated by reference:

$3^{rd}$ generation partnership project, Technical specification group core network, Out of band transcoder control—Stage 2 (3GPP TS 23.153 V4.4.0 (2001-12));

$3^{rd}$ generation partnership project, Technical specification group core network, Bearer-independent circuit-switched core network, Stage 2 (3GPP TS 23.205 V4.4.0 (2002-03));

$3^{rd}$ generation partnership project, Technical specification group (TSG) RAN3, Transcoder free operation (3GPP TR 25.953 V4.0.0 (2001-03));

$3^{rd}$ generation partnership project, Technical specification group services and system aspects, Inband tandem free operation (TFO) of speech codecs, service description—Stage 3 (3GPP TS 28.062 V5.0.0 (2002-03));

SUMMARY OF THE INVENTION

According to a first broad aspect, there is provided a data communication apparatus, comprising an interface for enabling communication with a remote entity via a network and a control entity in communication with said interface. The control entity is operative to establish a packet-switched connection with the remote entity through the network and to negotiate with the remote entity using in-band signaling entry into a codec-bypass mode of operation.

According to a second broad aspect, there is provided a method for execution in a data communication apparatus, comprising establishing a packet-switched connection with a remote entity through a network and negotiating with the remote entity using in-band signaling entry into a codec-bypass mode of operation.

According to a third broad aspect, there is provided a computer-readable storage medium containing a program element for execution by a data communication apparatus to implement a method. The method comprises establishing a packet-switched connection with a remote entity through a network and negotiating with the remote entity using in-band signaling entry into a codec-bypass mode of operation.

According to a fourth broad aspect, there is provided a data communication apparatus, comprising means for establishing a packet-switched connection with a remote entity through a network and means for negotiating with the remote entity using in-band signaling entry into a codec-bypass mode of operation.

According to a fifth broad aspect, there is provided a data communication apparatus, comprising an interface for enabling communication with a remote access network via a core network and a control entity in communication with said interface. The control entity is operative to establish a packet-switched connection with the remote access network through a core network and use in-band signaling to coordinate with the remote access network a functionality of the connection.

According to a fifth broad aspect, there is provided a method for execution in a data communication apparatus. The method comprises establishing a packet-switched connection with a remote access network through a network and using in-band signaling to coordinate with the remote access network a functionality of the connection.

According to a sixth broad aspect, there is provided a computer-readable storage medium containing a program element for execution by a data communication apparatus to implement a method. The method comprises establishing a packet-switched connection with a remote access network through a network and using in-band signaling to coordinate with the remote access network a functionality of the connection.

According to a seventh broad aspect, there is provided a data communication apparatus, comprising means for establishing a packet-switched connection with a remote access network through a network and means for using in-band signaling to coordinate with the remote access network a functionality of the connection.

According to an eighth broad aspect, there is provided a data communication apparatus, comprising an interface for enabling packet-switched communication with a first remote entity and a second remote entity and a control entity in communication with said interface. The control entity is operative to negotiate with the remote entity using in-band signaling entry into a codec-bypass mode of operation and, upon successful negotiation of entry into the codec-bypass mode of operation, forward compressed audio information received from the first entity to the second entity and forward compressed audio information received from the second entity to the first entity.

These and other aspects and features of the present invention will now become apparent to those of ordinary skill in the art upon review of the following description of specific embodiments of the invention in conjunction with the accompanying drawings.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION OF THE PREFERRED EMBODIMENTS

Figure 1A:
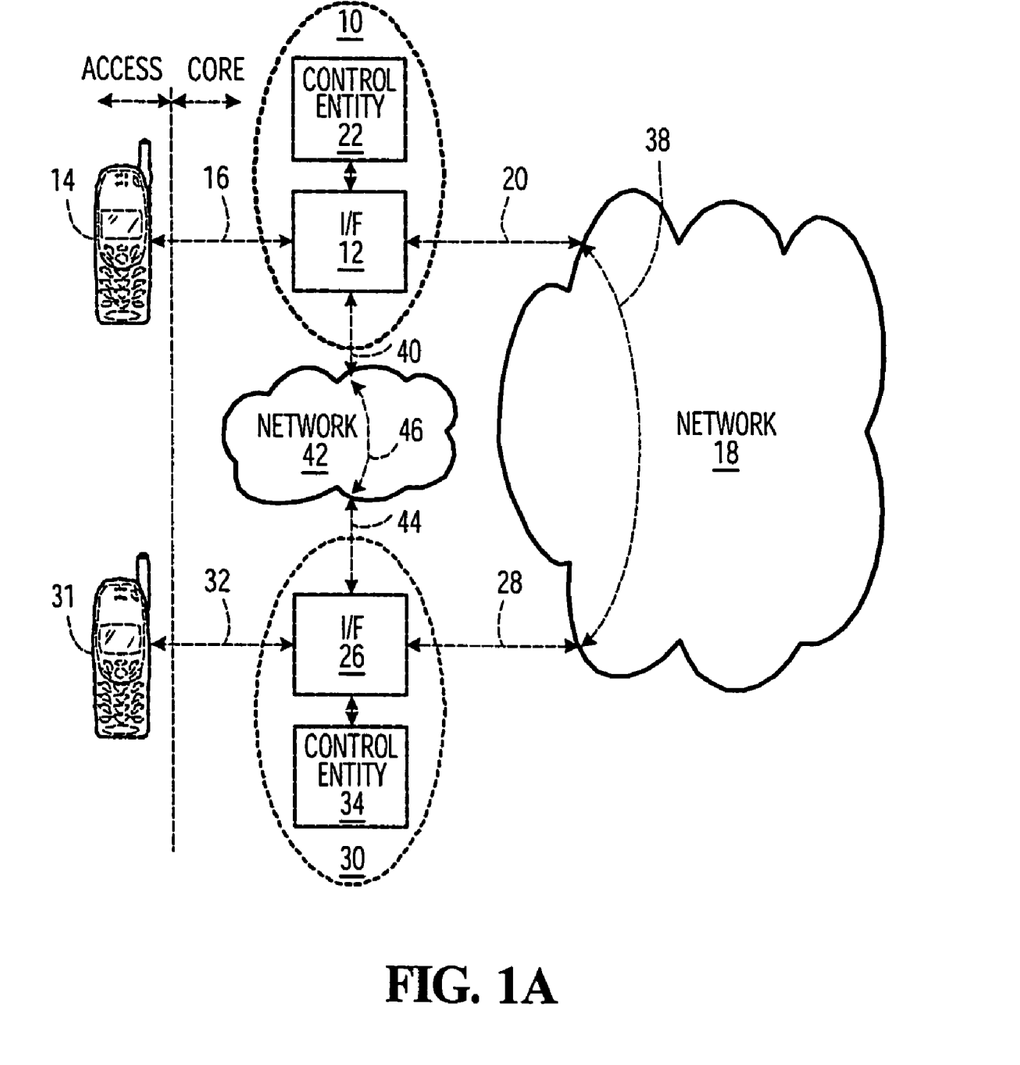
FIG. 1A illustrates an arrangement of network elements in accordance with an example of implementation of a first embodiment of the present inventive concept.

FIG. 1A illustrates an arrangement of network elements in accordance with an example of implementation of a first embodiment of the present inventive concept. In this first embodiment, a data communication apparatus is equipped with the functionality to participate in a messaging protocol using in-band signaling to determine whether to transfer any part of an existing connection along an alternate connection.

With particular reference to FIG. 1A, there is shown a data communication apparatus 10, which can be a base station controller (BSC) in a cellular network such as TDMA and CDMA. The data communication apparatus 10 includes an interface 12 and a control entity 22. The interface exchanges audio information, typically, in the form of compressed audio information (e.g., speech parameters), with a mobile unit 14 over a link 16, which may or may not be a wireless link. The control entity typically has resources capable of data or speech compression and/or decompression. To this end, the control entity 22 may include a codec, an echo canceller and other functional components (not shown). The control entity 22 is also equipped with suitable circuitry, software and/or control logic for providing call setup and call processing functionality, such as notification of impending handover, three-way calls, and so on.

The data communication apparatus 10 is connected through the interface 12 to a network 18 via a communication link 20. In a specific example of implementation, the network 18 is a circuit-switched (time-division multiplexed) network across which speech samples are exchanged amongst data communication apparatuses, e.g., in a format such as G.711, G.722 or G.726. In the specific case of G.711, speech samples are exchanged at a rate of 64 kb/s. The conversion from compressed audio information to speech samples and vice versa is effected by a codec in the control entity 22. It should also be understood that in some embodiments, the network 18 may be a packet-switched network based on, e.g., Asynchronous Transfer Mode (ATM) or Internet Protocol (IP), or the network 18 may be a mixed circuit-switched and packet-switched network.

The control entity 22 in the data communication apparatus 10 is adapted to establish connections (e.g., voice calls) with remote entities via the network 18. In addition, the control entity 22 is equipped with the capability of participating in a messaging protocol using in-band signaling with such remote entities. By "in-band" signaling it is meant that the messaging protocol involving two communicating entities shares the same connection as the user data between these two entities. The expression "user data" is intended to encompass data exchanged during either or both of the call setup phase (i.e., the called party is identified and queried such as by way of ringing) and the post-call-setup phase (i.e., after the called party has answered and a call has been established). In a packet-switched environment, in-band signaling may be implemented as a stream of packets of control information having the same source and destination as packets of user data. The packets containing the control information may be transmitted asynchronously with respect to the packets containing the user data. Moreover, the packets containing the control information may follow a different route through the network than the packets containing the user data. This may be necessitated by, e.g., congestion constraints in the network. The reader skilled in the art will thus appreciate that there are myriad ways of implementing a suitable messaging protocol using in-band signaling. In no way is the present invention limited by any particular industry standard.

Also shown in FIG. 1A is a second data communication apparatus 30, which can be a base station controller (BSC) in a cellular network, for example. The data communication apparatus 30 includes an interface 26 and a control entity 34. The control entity 34 comprises codec circuitry/software/control logic as well as suitable circuitry, software and/or control logic for providing call setup and call processing functionality, such as notification of impending handover, three-way calls, and so on.

For the purposes of this example, it is assumed that the data communication apparatus 10 is the calling party and that the data communication apparatus 30 is the called party, although the reverse may be the case without departing from the spirit of the present invention. It is also assumed that both data communication apparatuses 10, 30 are "codec-bypass-capable" in order that a "codec-bypass connection" is possible. By "codec-bypass-capable" is meant the capability to operate in a codec-bypass mode of operation whereby audio information (e.g., speech) received from the access network or mobile unit is sent into the network 18 in compressed form without decoding. By "codec-bypass connection" is meant a connection that carries information exchanged between entities operating in a codec-bypass mode of operation. It should be expressly understood that these terms are not to be limited to any particular industry standard, and in particular those industry standards that may employ the word "tandem" or "codec-bypass".

The control entity 34 in the data communication apparatus 30 communicates over the network 18 via interface 26 and a communication link 28, while it exchanges compressed audio information with a terminal equipment 31 (e.g., mobile unit, desktop phone, etc.) via interface 26 and a link 32 which may or may not be a wireless link. The control entity 34 is further responsible for communicating with the control entity 22 of the data communication apparatus 10 by way of a messaging protocol using in-band signaling.

Moreover, in the embodiment illustrated in FIG. 1A, the data communication apparatuses 10, 30 are further connected to a common network 42. The network 42 may be a packet-switched network or a circuit-switched network or a mixed packet-switched and circuit-switched network. Specifically, the interface 12 connects via a communication link 40 while the interface 26 connects via a communication link 44. Thus, it may be possible to establish an alternate connection between data communication apparatus 10 and data communication apparatus 30 through the network 42. It should be understood that the alternate connection may be established through the original network 18 (via links 20 and 28) or through another network different from the network 42 and to which the data communication apparatuses 10, 30 are connected.

In operation, when a connection is established up between the data communication apparatus 10 and the data communication apparatus 30, a connection 38 is established within the network 18 between communication link 20 of data communication apparatus 10 and communication link 28 of data communication apparatus 30. In accordance with one implementation, the control entities 22, 34 being codec-bypass-capable, employ a messaging protocol using in-band signaling to exchange codec-bypass-mode setup information and, subsequently, compressed audio information. When the connection 38 is a circuit-switched connection, this information can be exchanged using different subsets of bits from among the bits ordinarily used for transmission of speech samples between the data communication apparatus 10 and the data communication apparatus 30, a process commonly referred to as bit stealing. When the connection 38 is a packet-switched connection, this information can be exchanged using a separate stream of packets that may be asynchronous to the other packets being transmitted along the connection 38.

By virtue of the messaging protocol, each control entity 22, 34 will receive codec-bypass-mode setup information from the other control entity, which will indicate to the recipient control entity that a remote data communication apparatus is capable of entering a codec-bypass mode of operation. During the negotiation process, various parameters may be exchanged between the control entities 22, 34 prior to entering a codec-bypass mode of operation. Examples of a messaging information included in the negotiation process are codec type and codec configuration descriptions such as ETSI Standard AMR or EFR.

For example, each control entity 22, 34 will use the messaging protocol to indicate to the other control entity whether it has access to the network 42. If both data communication apparatuses 10, 30 indeed have a link to the network 42, as is the case in FIG. 1A, addresses may be exchanged to allow the transmission of either the compressed or uncompressed audio information over a second connection 46 established through the network 42, as defined by the addresses of the two data communication apparatuses 10, 30. Another example of codec-bypass-mode setup information includes a list of codecs supported by the control entity providing the information. Also during the negotiation process, information could be sent to each of the control entities 22, 34 in order to arrange for required changes in the routing of the packets.

The second connection 46 maybe a packet-switched connection or a circuit-switched connection (e.g., Asynchronous Transfer Mode Adaptation Layer 2—AAL2), depending on the properties of the network 42. Once the second connection 46 has been established, part or all of the data exchanged via connection 38 is now transferred to the second connection 46. Such transfer may be done in several ways.

In a first variant, transmission of audio information over the second connection 46 takes place in compressed format, i.e., the data communication apparatuses 10, 30 exchange compressed audio information with one another over the network 42. This can be done by suspending the transfer of speech samples over the connection 38 or while continuing to transfer speech samples over the connection 38. If it is done while suspending the transmission of speech samples via the connection 38, this will allow the codecs in both control entities 22, 34 to be disabled, resulting in resource savings. On the other hand, it may be desirable to continue exchanging speech samples along the connection 38, e.g., by using a reduced number of fixed-duration time slots when connection 38 is a circuit-switched connection. This may be done in the interest of maintaining synchronization between the two codecs in the event that the second connection 46 fails and communication must revert back to use of the connection 38. Still other variants will retain the connection 38 in its entirety in order to perform voice quality enhancement functions.

In a second variant, it is within the scope of the invention to transfer speech samples in their decompressed format (e.g., G.711) across the second connection 46. Thus, it will be appreciated that even though the second connection 46 is established as a result of both control entities 22, 34 being codec-bypass-capable, it is not a requirement that the audio information sent along the second connection 46 (when used) be in compressed form.

Those skilled in the art will further appreciate that when necessary, the data format can be altered in a dynamic fashion to meet any particular requirements, such as transmission of dual-tone multi-frequency (DTMF) signals, etc.

Those skilled in the art will also appreciate that in some cases, the second connection 46 is not required. Rather, compressed audio information can be sent over the original connection 38. Specifically, the original connection 38 is used as the vehicle for transmitting packets of control information used to negotiate entry into a codec-bypass mode of operation. It should be expressly noted that the original connection 38 may, in some embodiments, represent the connection existing during call setup (prior to the call being answered by data communication apparatus 30) and, in other embodiments, represent the connection used to transmit traffic during normal operation of a call. If the negotiation performed by the messaging protocol using the in-band signaling is successful, then the data communication apparatus 10 and the data communication apparatus 30 begin to transmit to one another packets of compressed audio information over the original connection 38.

Figure 1B:
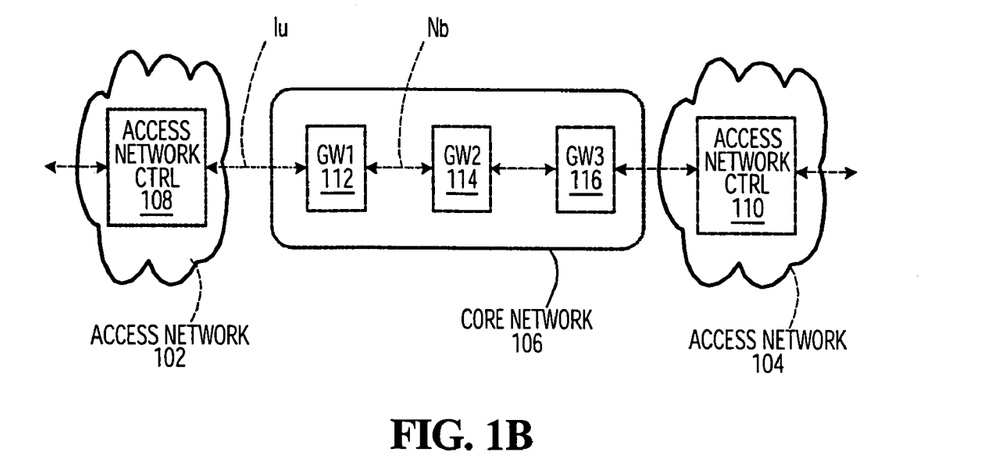
FIG. 1B illustrates a variant of the arrangement in FIG. 1A.

Furthermore, the use of in-band signaling to convey a messaging protocol enables data communication apparatuses to exhibit features other than and in addition to operation in a codec-bypass mode. With reference to FIG. 1B, for example, there is shown a scenario in which a first access network 102 is connected to a second access network 104 via a core network 106. At the edge of the first access network 102 is an access network controller 108 and at the edge of the second access network 104 is an access network controller 110. By way of example, the core network 106 is represented by gateways 112, 114 and 116, where gateway 112 is connected to access network controller 108, gateway 116 is connected to access network controller 110 and gateway 114 is connected between gateways 112 and 116.

The access network controllers 108, 110 (sometimes referred to as radio network controllers—RNCs) are equipment in a radio network subsystem typically in charge of controlling the use and the integrity of the radio resources. The radio network subsystem offers the allocation and the release of specific radio resources to establish means of connection in between user equipment and the data communication apparatus. Thus, in a cellular environment, a radio network subsystem can be responsible for managing the resources and transmission/reception in a set of cells.

The interfacing between the access network controller 108 (or the access network controller 110) and the core network 106 can be referred to in some standards (e.g., UMTS) as the "Iu" user plane, although this is used by way of example only and is not to be considered as a limitation of the present invention. The "Iu" user plane is defined by a communication protocol with well defined user traffic and in-band control signal packet formats. The interfacing between the gateways 112, 114, 116 can be referred to in some standards as the "Nb" user plane, although this is used by way of example only and is not to be considered as a limitation of the present invention. The "Nb" user plane is defined by a communication protocol with well defined user traffic and in-band control signal packet formats very similar to the "Iu" user plane communication protocol.

In accordance with the embodiment of the present invention being described at present, a communication protocol based on in-band signaling over packet communication networks is used. Examples include "Iu user plane" and "Nb user plane" mentioned above. The in-band signaling can be used during and after call setup, as soon as a user traffic path is available. The in-band signaling can originate at any of the access network controllers 108, 110 or gateways 112, 114, 116. Since the messages can be generated internally or externally to the network equipment that performs tandem free operation negotiation (typically gateways 112, 116), in-band signaling can now be used by the access network controllers 108, 110 to coordinate new functionalities of the connection. Examples of new functionalities includes end-to-end access network coordination such as power control, link adaptation and audio quality enhancement, as well as end-to-end core network coordination such as codec-bypass operation, codec selection/switching and signal processing functions coordination and switching. Furthermore, the messages exchanged using the in-band signaling can be asynchronous to a user traffic signal, e.g. a speech signal.

If the messaging protocol is standardized, then this protocol can be used to invoke non-standard functions without violating standards compliance. Thus, terminating and transit gateways 112, 114, 116 in the core network 106 see the same communication protocol and signaling message format. Hence, the gateways 112, 114, 116 may be designed with or without the capability and support of non-standard functions. Also, terminating gateways (such as 112 and 116 in FIG. 1B) do not require the presence of non-standard-function-compliant transit gateways (e.g., gateway 114) to negotiate and operate the non-standard functions. The design is thus interoperable and compatible to entities which supporting the standard communication protocol but which may be located outside the core network. Hence, these entities may introduce non-standard functions and participate in end-to-end system optimization.

Figure 2:
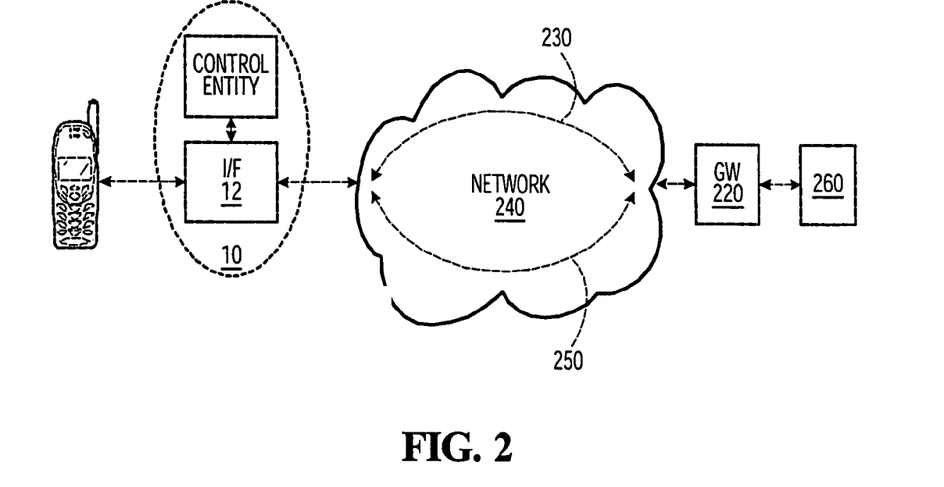
FIGS. 2 to 4 illustrate various arrangements of network elements in accordance with respective examples of implementation of a second embodiment of the present inventive concept.
Figure 3:
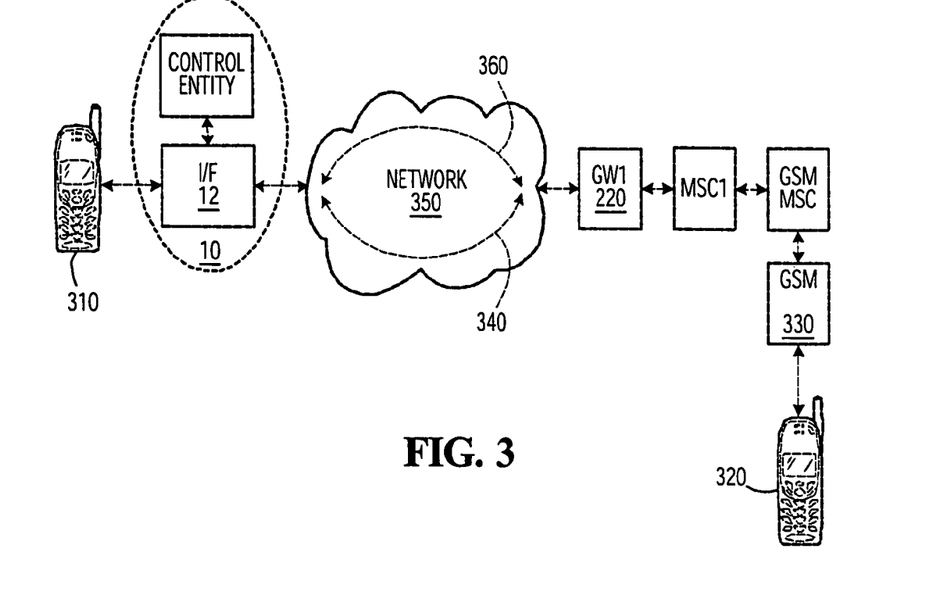
Figure 4:
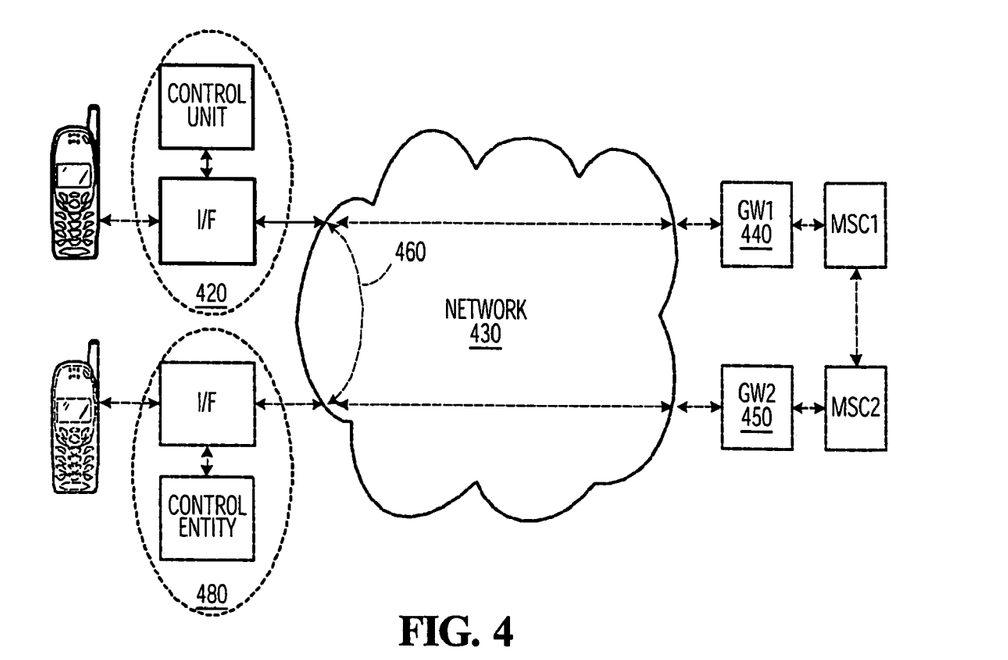

FIGS. 2 to 4 illustrate various arrangements of network elements in accordance with respective examples of implementation of a second embodiment of the present inventive concept which may also be used in conjunction with the principles described above in relation to the first embodiment of the present invention. In this second embodiment, a gateway connected to a non-codec-bypass-capable entity is equipped with the intelligence to emulate a codec-bypass-capable entity. With particular reference to FIG. 2, data communication apparatus 10 proceeds to send codec-bypass-mode setup messages in an attempt to communicate with a remote entity 260 via a gateway 220. This is effected over a first connection 230 established through a network 240. The first connection 230 may be a circuit-switched connection or a packet-switched connection. The gateway 220 monitors the messages but it does not respond as it awaits a response from remote entity 260.

After a timeout period, recognizing that the entity connected at the other end is not codec-bypass-capable, the gateway 220 can proceed to initiate its own response, with the ensuing handshaking resulting in the transmission of compressed audio information through a second connection 250 established through the network 240. Alternatively, the compressed audio information could be sent along the first connection 230. The gateway 220 includes a codec and an internal control entity similar to the control entity 22 in the data communication apparatus 10 described earlier with reference to FIG. 1A. Note that the signal processing functionality previously associated with the codec in the control entity 22 has been shifted to the gateway 220. Other functionality that could be shifted to the gateway 220 may include echo cancellation, automatic gain control and so on.

With particular reference to FIG. 3, there is shown a connection between 3G and 2G wireless networks. In this case, an original connection 360 is established between a mobile unit 310 (e.g., a UMTS mobile unit) and another mobile unit 320 (e.g., a GSM mobile unit) through a network 350. For this example, it is assumed that the GSM mobile unit 320 has a connection to the network 350 via a GSM data communication apparatus 330. Ultimately, the execution of the messaging protocol over in-band signaling, as described earlier with reference to FIG. 2, will lead to transfer of the codec from data communication apparatus 10 to gateway 220 and also to the transfer of traffic to a connection (such as the original connection 360 or a new connection 340), resulting in minimization of the transmission bandwidth between the two nodes. In addition, execution of the messaging protocol over in-band signaling will result in the gateway 220 and the GSM data communication apparatus 330 entering into a codec-bypass mode of operation and thus a virtual end-to-end codec-bypass connection will be established.

According to one variant, the gateway 220 detects codec-bypass-mode setup information messages exchanged during negotiations between the GSM data communication apparatus 330 and data communication apparatus 10, but will not react until such negotiations are concluded. However, the GSM data communication apparatus 330 in this example is not linked to a packet-switched network, and thus the protocol will advance only as far as gateway 220. Gateway 220 monitors the process and recognizes that the full optimization has not been achieved. It can then carry out a dialog with the data communication apparatus 10 to transfer the codec functionality to gateway 220 and establish a codec-bypass connection (original connection 360 or a new connection 340) through the network 350, thus reducing the transmission bandwidth between the two nodes.

With particular reference to FIG. 4, there is shown a more complex scenario for the signal path, where an original connection originates from a data communication apparatus 420, traverses a packet-switched network 430 and gateways 440, 450, before connecting to a second data communication apparatus 480 back through the packet-switched network 430. Once the messaging protocol is exercised using in-band signaling to exchange the addresses of the two data communication apparatuses 420, 480, a second connection 460 through the packet-switched network 430 is chosen to continue the transmission of the traffic signal. The handshaking sequence is as follows: data communication apparatus 420 and data communication apparatus 480 initiate the messaging protocol using in-band signaling, identifying themselves as "endpoint" units. The in-path gateways 440, 450 recognize the exchange between two endpoint data communication apparatuses 420, 480 and allow the codec-bypass connection to take place.

Figure 5:
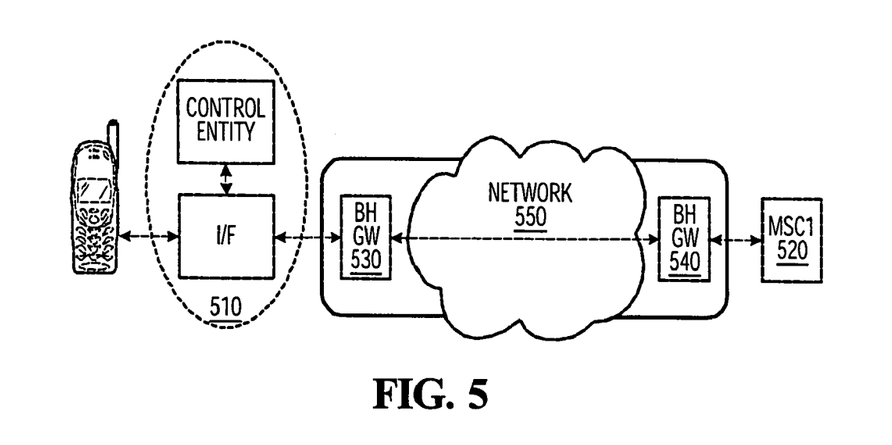
FIG. 5 illustrates an arrangement of network elements in accordance with an example of implementation of a third embodiment of the present inventive concept.

FIG. 5 illustrates an arrangement of network elements in accordance with an example of implementation of a third embodiment of the present inventive concept. According to this third embodiment, a "backhaul" gateway that employs a codec format that is incompatible with standardized codec-bypass operation is given the intelligence to allow codec-bypass operation to take place and reduce bandwidth.

With particular reference to FIG. 5, there is shown a network configuration, in which a data communication apparatus 510 is connected to a remote entity, in this case a mobile switching center (MSC) 520 through a pair of "backhaul" gateways (BH GW) 530, 540 at either end of a network 550. Such gateways 530, 540 are likely to operate codecs such as G.729, G.726, or G.723.1, which are not compatible with codec-bypass operation between data communication apparatus 510 and MSC 520. In particular, for the case of a circuit-switched connection, codec-bypass operation is facilitated when certain specified bits of a G.711 sample stream are used to transmit the codec-bypass-mode setup information or the compressed audio information. However, the use of a codec that manipulates the G.711 sample stream is likely to distort the information contained therein.

This will result in the tandeming of two codecs in land-mobile connections, and at least three codecs in mobile-mobile calls. One way to avoid this problem is to provide the backhaul gateways 530, 540 with the intelligence to recognize and support the messaging protocol exchanged using in-band signaling for codec bypass operation. In this case, transfer of the compressed audio information would be exchanged without bit-stealing the data in the incompatible format exchanged between the backhaul gateways 530, 540. The compressed audio information could then be carried from, say, backhaul gateway 530 to backhaul gateway 540, whereupon it will be injected back into the G.711 sample stream in place of the incompatible transcoding in backhaul gateways 530 and 540.

The mechanism just described with reference to FIG. 5 permits the various scenarios described herein above with reference to FIGS. 1-4 to reach their optimal mode of operation despite the presence of backhaul gateways 530, 540 with incompatible codecs. For example, in a call scenario that involves a gateway connected to a circuit-switched network, the gateway may need to be provided not only with the functionality to bypass an incompatible codec as described in connection with FIG. 5, but also with the functionality described in connection with FIG. 2, wherein the gateway acquires codec functionality, hence allowing a codec-bypass mode of operation. In such a case, signal processing functionality can be shifted closer to the edge of a network.

Figure 6:
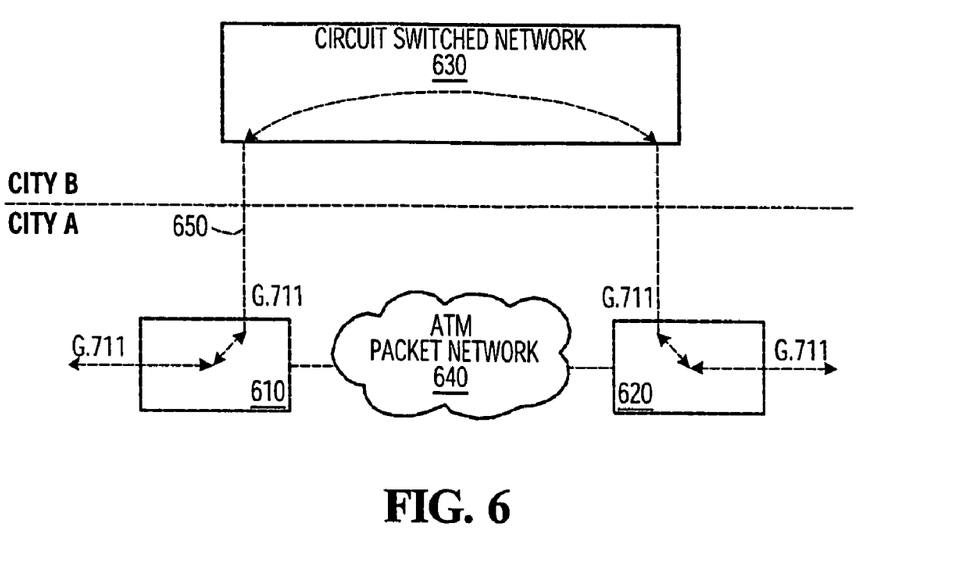
FIGS. 6 to 8 illustrate an example of a call scenario in accordance with an example of implementation of a fourth embodiment of the present inventive concept.
Figure 7:
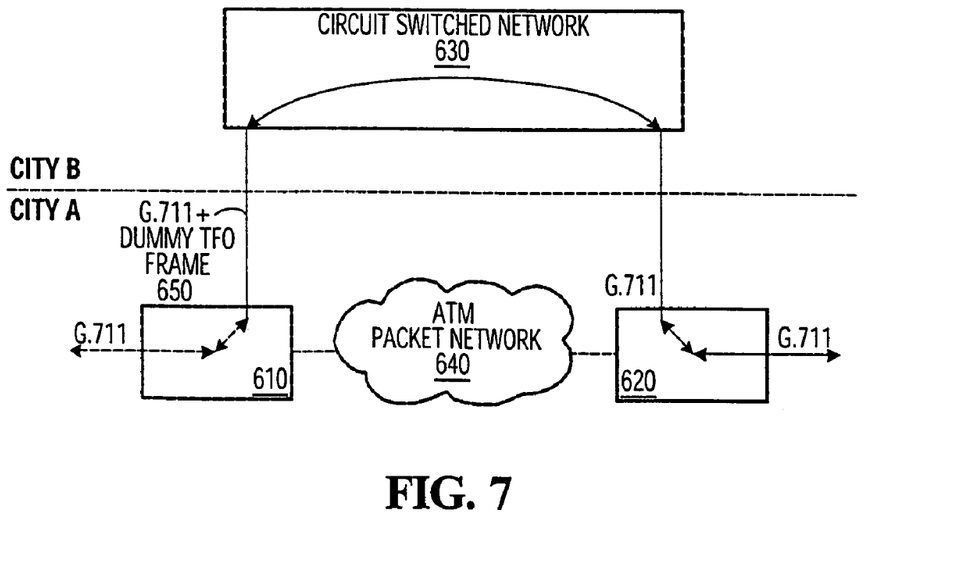
Figure 8:
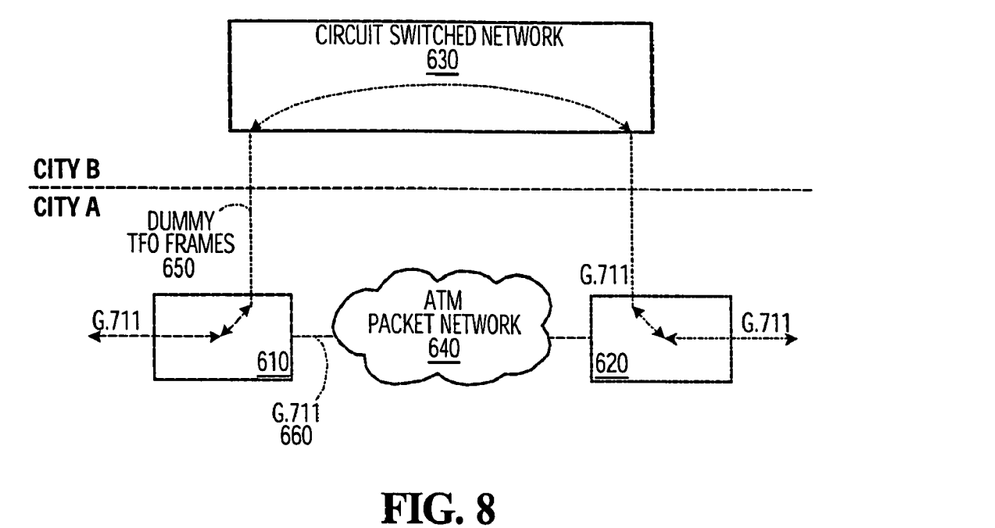

FIGS. 6 to 8 illustrate an example of a call scenario in accordance with an example of implementation of a fourth embodiment of the present inventive concept. According to this fourth embodiment, a codec-bypass connection is used as a backup connection while speech samples are transmitted over a packet-switched network. With particular reference to FIG. 6, a call is to take place between parties via two gateways 610, 620 both located in City A. Both gateways 610, 620 have access to a circuit-switched network 630 that is configured in such a way as to require the call to be routed through City B. The data format exchanged over the network 630 is assumed to be G.711 for the purposes of the present example, although other formats are possible. In addition, both gateways 610, 620 are linked via a packet-switched network, say an ATM network 640.

FIG. 6 illustrates the situation during call initiation. The call starts in the normal way with an inter-city path 650 being established over a network 630. Each gateway 610, 620 thus exchanges G.711 data via City B over the path 650, without involving the packet-switched network 640. Once the call is established, either one or both gateways 610, 620 start probing the path 650 by way of the messaging protocol using in-band signaling in order to identify peers, i.e., to determine whether another gateway along the path 650 is also codec-bypass-compatible. In this case, it is assumed that the gateways 610, 620 identify one another as peers and that the gateways 610, 620 proceed to establish a codec-bypass connection over the path 650.

FIG. 7 illustrates the situation once a codec-bypass connection has been established between the gateways 610, 620 via City B. Specifically, the path 650 carries the G.711 data as well as in-band messaging information. However, the in-band messaging information may consist of a reduced amount of in-band messaging information as compared with that required to transmit compressed audio information. In other words, the codec-bypass connection may involve the transmission of "dummy" frames, where by "dummy frame" is meant a frame sent by one of the gateways 610, 620 that the other gateway will recognize such that the codec-bypass connection will be maintained, i.e., not dropped. The objective of the codec-bypass connection in this particular embodiment is to keep the connection over path 650 alive so as to maintain a path that can be used as a fallback position in the event of a disturbance, as will be described in greater detail herein below.

At this point, the gateways 610, 620 proceed to transfer the portion of the connection containing speech samples over to the packet-switched network 640. The purpose of this negotiation process, which may require out-of-band resources, is for the gateways 610, 620 to establish a "short-cut" path therebetween by passing through the packet-switched network, which does not pass through City B.

FIG. 8 illustrates the situation when the portion of the path 650 containing G.711 speech samples has been transferred to the short-cut path 660. The G.711 data now flows through the packet-switched network 640. Meanwhile, the codec-bypass connection over the path 650 is still kept alive by sending only basic signaling information. It will be appreciated that the bandwidth used by this residual codec-bypass connection is small.

In a scenario wherein the entity at City B via which the codec-bypass connection is maintained "disturbs" the call such as by attempting a call conferencing or call transfer operation then operation returns to the scenario at FIG. 6, where the G.711 data flow is routed via City B and the connection through the packet-switched network 640 is severed.

It will also be appreciated that the functional elements of the data communication apparatuses and gateways described above may be implemented as parts of an arithmetic and logic unit (ALU) having access to a code memory which stored program instructions for the operation of the ALU. The program instructions could be stored on a medium which is fixed, tangible and readable directly by the data communication apparatus or gateway, (e.g., removable diskette, CD-ROM, ROM, or fixed disk), or the program instructions could be stored remotely but transmittable to the data communication apparatus or gateway via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Those skilled in the art should also appreciate that the program instructions stored in the code memory can be compiled from a high level program written in a number of programming languages for use with many computer architectures or operating systems. For example, the high level program may be written in assembly language, while other versions may be written in a procedural programming language (e.g., "C") or an object oriented programming language (e.g., "C++" or "JAVA").

Those skilled in the art will further appreciate that in some embodiments of the invention, the functionality of the TRAUs and gateways may be implemented as pre-programmed hardware or firmware elements (e.g., application specific integrated circuits (ASICs), electrically erasable programmable read-only memories (EEPROMs), etc.), or other related components.

While specific embodiments of the present invention have been described and illustrated, it will be apparent to those skilled in the art that numerous modifications and variations can be made without departing from the scope of the invention as defined in the appended claims.

What is claimed is:

1. A data communication apparatus, comprising:
an interface for enabling communication with a remote entity via a network;
a control entity in communication with said interface and operative to:
establish a first packet-switched connection with the remote entity through the network;
negotiate with the remote entity using in-band signaling entry into a codec-bypass mode of operation, and establish a second connection with the remote entity through a second packet-switched network; and
a codec for decompressing compressed audio information destined for the remote entity via the first or second connection and compressing decompressed audio information received from the remote entity via the first or second connection.

2. The data communication apparatus defined in claim 1, wherein the control entity being operative to negotiate using in-band signaling comprises the control entity being operative to exchange control information over said first or second connection.

3. The data communication apparatus defined in claim 2, wherein said first or second connection carries call setup information exchanged between the data communication apparatus and the remote entity.

4. The data communication apparatus defined in claim 3, wherein the control information and the call setup information are exchanged asynchronously to one another.

5. The data communication apparatus defined in claim 3, wherein the control entity is further operative to exchange compressed audio information with the remote entity after successful negotiation of the entry into the codec-bypass mode of operation.

6. The data communication apparatus defined in claim 5, wherein the control entity is further operative to exchange the compressed audio information over said first or second connection.

7. The data communication apparatus defined in claim 6, wherein said control entity is further operative to suspend the exchange of audio information over the first connection.

8. The data communication apparatus defined in claim 6, wherein said control entity is further operative to exchange the compressed audio information over said second connection while continuing the exchange of audio information over the first connection.

9. The data communication apparatus defined in claim 8, wherein the audio information exchanged over the first connection is in an uncompressed format.

10. The data communication apparatus defined in claim 2, wherein said first or second connection carries audio information exchanged between the data communication apparatus and the remote entity.

11. The data communication apparatus defined in claim 10, wherein the control information and the audio information are exchanged asynchronously to one another.

12. The data communication apparatus defined in claim 10, wherein the control entity is further operative to exchange compressed audio information with the remote entity after successful negotiation of the entry into the codec-bypass mode of operation.

13. The data communication apparatus defined in claim 12, wherein the control entity is further operative to exchange the compressed audio information over said first or second connection.

14. The data communication apparatus defined in claim 12, wherein said control entity is further operative to suspend the exchange of audio information over the first or second connection.

15. The data communication apparatus defined in claim 12, wherein said control entity is further operative to exchange the compressed audio information over said second connection while continuing the exchange of audio information over the first connection.

16. The data communication apparatus defined in claim 15, wherein the audio information exchanged over the first connection is in an uncompressed format.

* * * * *